United States Patent

[11] 3,552,620

| [72] | Inventor | William H. Neubeck, Jr. |
| --- | --- | --- |
| | | Justice, Ill. |
| [21] | Appl. No. | 811,348 |
| [22] | Filed | Mar. 28, 1969 |
| [45] | Patented | Jan. 5, 1971 |
| [73] | Assignee | Julian Engineering Company |
| | | Chicago, Ill. |
| | | a corporation of Illinois |

[54] HANGER LOADING APPARATUS
17 Claims, 5 Drawing Figs.

| [52] | U.S. Cl. | 226/105 |
| --- | --- | --- |
| [51] | Int. Cl. | B65h 17/00 |
| [50] | Field of Search | 226/104, 105 |

[56] References Cited
UNITED STATES PATENTS

| 3,204,844 | 9/1965 | Wallace | 226/104 |
| --- | --- | --- | --- |
| 3,360,172 | 12/1967 | Frey | 226/97 |

Primary Examiner—Allen N. Knowles
Assistant Examiner—Gene A. Church
Attorney—Pendleton, Neuman, Williams & Anderson ABSTRACT: In a machine for transporting strands of material such as a linked sausage strand along a predetermined path on hangers which are pivotally mounted on a travelling conveyor, means is provided for feeding the strands downwardly into the path of the hangers at a predetermined location. Each hanger is swung rearwardly from its normal hanging position as it is moved toward said location, and means is provided for forcibly swinging the hanger forwardly from a rearwardly disposed position through its normal hanging position and through said location, whereby the strands of material may be festooned over the hanger.

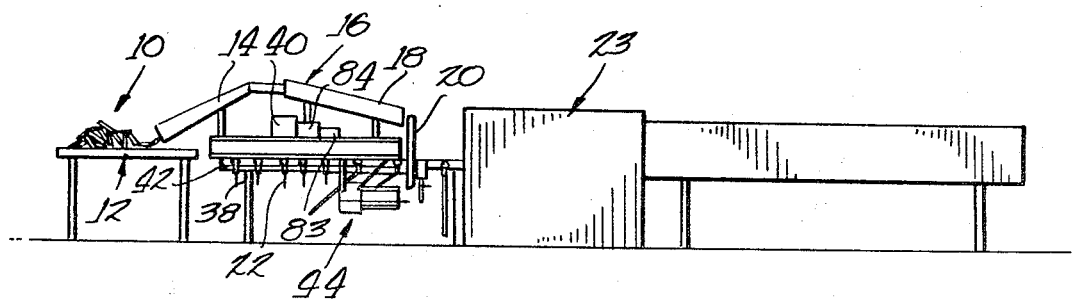
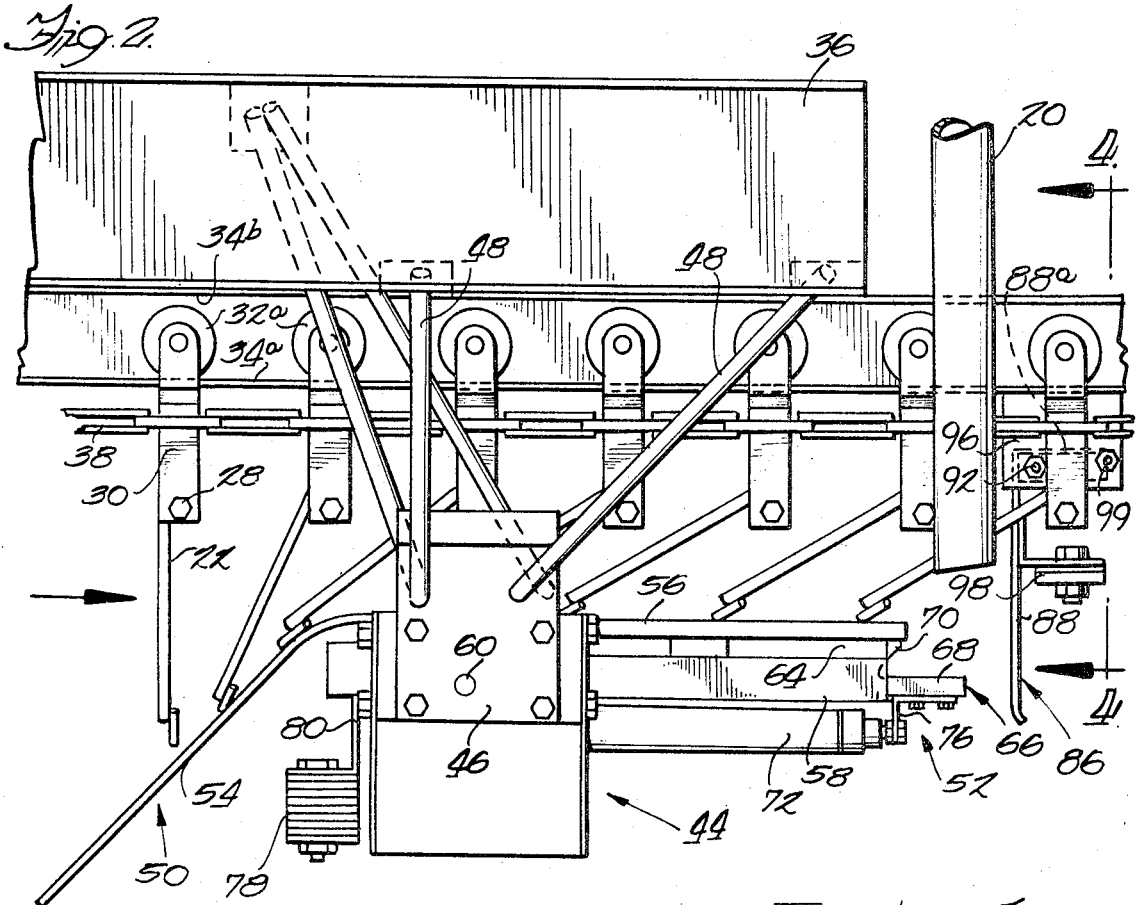

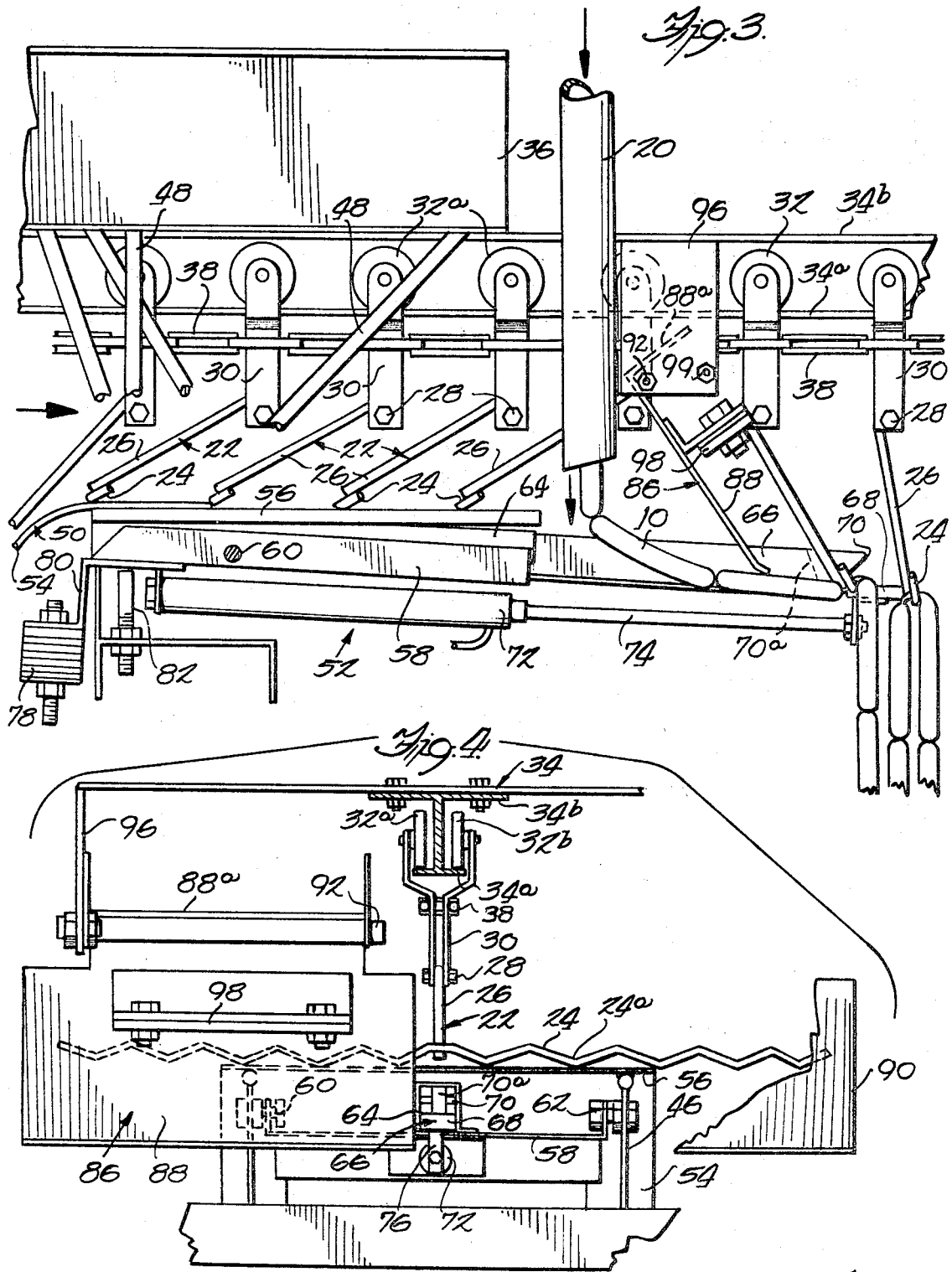

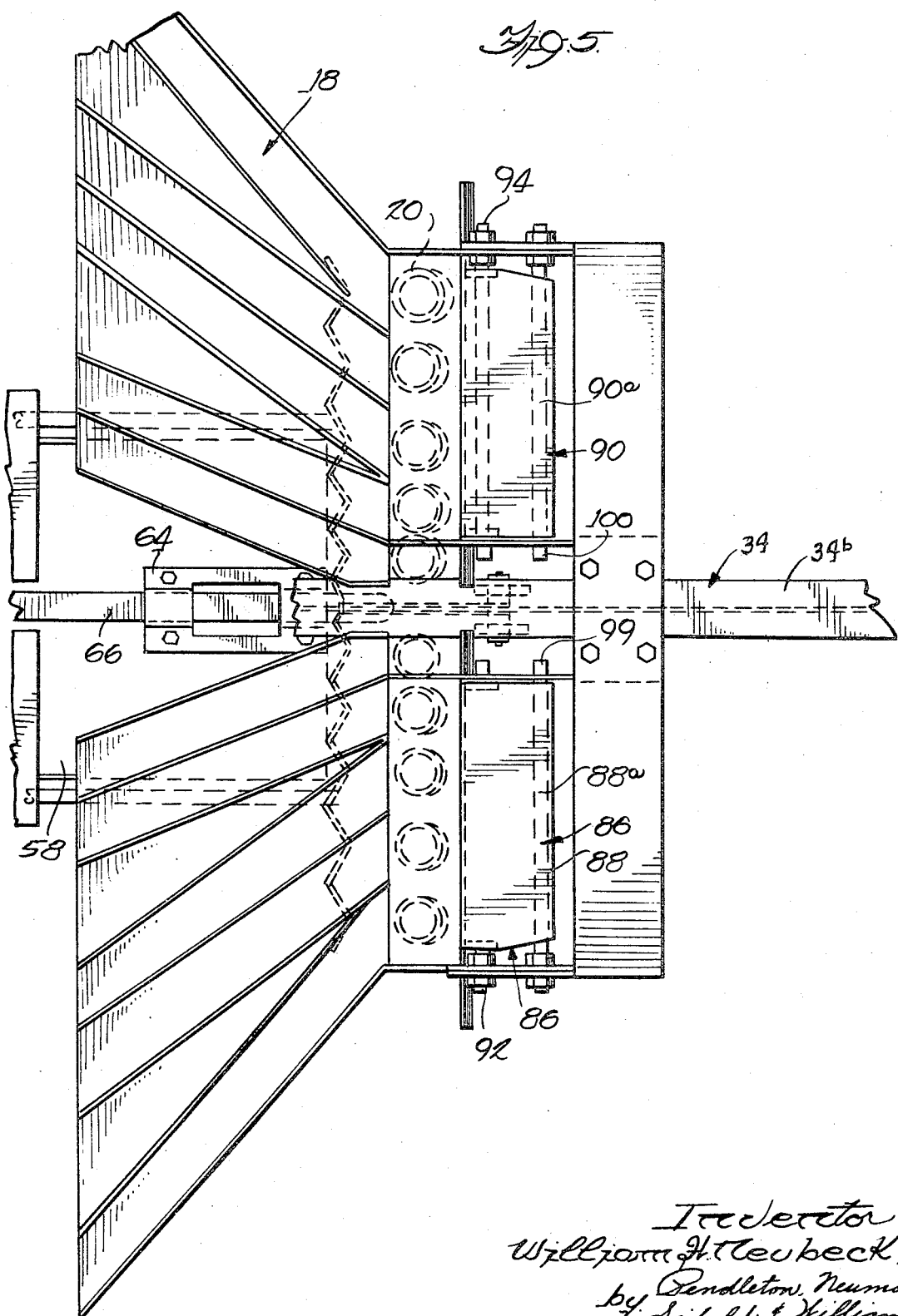

3,552,620

HANGER LOADING APPARATUS

BACKGROUND OF THE INVENTION

This invention relates to a machine for transporting strands of material of indeterminate length along a predetermined path, and more particularly to a mechanism for loading one or more strands onto the transporting hangers of such a machine. The invention, which is especially adapted for use in connection with the loading of linked sausage strands onto hangers for transporting through various processing chambers, may be advantageously employed in an apparatus such as illustrated in Wallace U.S. Pat. No. 3,204,844.

The present invention is particularly directed to apparatus for loading strands of material such as linked sausage strands onto the hangers which are suspended from and are moved along by a conveyor mechanism. The linked sausage strands are intended to be draped or festooned over the transverse strand-supporting formations of the hangers. It has been found that with a mechanism such as illustrated in the Wallace patent, the sausage strands may not be uniformly festooned over the hangers, and as a result, the strands, which may be linked merely by twisting, sometimes tend to become unlinked or they tend to drag against the sides or the bottoms of the chambers through which they are carried by the conveying mechanism. The uniform festooning of the linked sausage strands over the hangers is rendered difficult by the fact that the strands are somewhat stiff, and when they are fed downwardly into the path of the oncoming hangers, there is a tendency for the strand to continue to feed downwardly over the hanger which has passed the feed station rather than to drape itself over and feed downwardly behind that hanger and in front of the next oncoming hanger.

The present invention is intended to overcome this tendency of the sausage strands to overfeed the hangers and, therefore, be nonuniformly draped over the hangers. By means of the present invention the hangers and strands are manipulated in such a way as to obtain uniform festooning of the strands over the hangers, thus increasing the efficiency of the conveying mechanism and reducing damage to the strands in transit.

SUMMARY OF THE INVENTION

In accordance with one embodiment of the invention the machine for transporting a strand of material such as a linked sausage strand along a predetermined path includes a conveyor, a plurality of hangers, each having a transverse strand-supporting formation, and means pivotally connecting the hangers to the conveyor at spaced intervals so that the hangers will normally hang downwardly from the conveyor in a substantially vertical position. Means is provided for feeding at least one and preferably several strands of material downwardly into the path of the hangers at a predetermined location, and means is provided for swinging each hanger rearwardly from its normal hanging position as the hangers move toward said location and then forcibly swinging the hanger forwardly with respect to its normal hanging position through said location, whereby the strands of material will be festooned over the hanger. It is preferred that means be provided for urging the strand rearwardly and downwardly over the transverse strand-supporting formations of each hanger as that hanger is moved to a forwardly pivoted position.

The hanger swinging means preferably includes a pair of members, the first of which is fixedly mounted for engagement by the hangers as they are moved by the conveyor so that the hangers are swung rearwardly. The second member of the hanger swinging means has an element movable between a rearward and a forward position. In its rearward position the second member is adapted to receive each rearwardly swung hanger from the first member, and with the hanger member engaged, the element is then moved to its forward position, thereby swinging the engaged hanger forwardly through the feed location.

BRIEF DESCRIPTION OF THE DRAWINGS

In the drawings, FIG. 1 is a schematic illustration of a continuous sausage treating apparatus employing a mechanism for loading the sausage strands onto the hangers of a conveying mechanism in accordance with this invention;

FIG. 2 is an enlarged side elevational view of a portion of the apparatus illustrated in FIG. 1, showing the hangers being swung rearwardly by the first or fixed member of the hanger swinging means and showing the second or movable member in position to receive a hanger from the first member;

FIG. 3 is a view of the mechanism illustrated in FIG. 2 with the cover plate removed and showing the second member of the hanger swinging means after it has received a hanger from the first member and forcibly moved the hanger to a forwardly swung position;

FIG. 4 is a sectional view of the portion of the apparatus illustrated in FIG. 2 taken substantially along line 4—4 thereof and illustrating the means for urging the strands over the hanger as the hanger is moved forwardly; and FIG. 5 is a top plan view of the portion of the apparatus illustrated in FIG. 2.

DESCRIPTION OF THE PREFERRED EMBODIMENT

The apparatus of the present invention is particularly adapted for use in connection with the transporting and processing of link sausages such as wieners. In the processing of wieners a ground meat product is forced into a cellulose casing or tubing which may come in a length of approximately 84 feet. The filled casing is then linked by means of linking apparatus, usually either by tying or twisting the casing into individual uncured sections which remain connected in continuous end-to-end relationship.

In the schematic illustration of FIG. 1, the linked strands of sausages 10 are brought to a table or bin 12 and are manually placed on a conveyor 14 for transporting through the feed unit 16. The link sausage conveying mechanism 14 may be an opposed belt type unit as is commonly used in connection with the feeding of linked sausage strands. Such units are illustrated, for example, in U.S. Pat. No. 3,209,397 and No. 3,360,172. The discharge end of the feed unit 16 is best illustrated in detail in FIG. 5 and includes a plurality of chutes 18, each of which feeds into a separate delivery tube or conduit 20. In the illustrated embodiment, there are 10 chutes 18 and a corresponding number of delivery tubes 20. Thus the mechanism illustrated herein is adapted to handle simultaneously up to 10 strands of linked sausages.

The linked strands are intended to be draped over and festooned uniformly between the hangers 22. The festooned sausage strands are then conveyed on the hangers 22 through the treating apparatus 23 which may, for example, include a coagulant spray chamber, a cooking tunnel, a water-cooling apparatus, a chill operation and an unloading apparatus.

The present invention is directed to the apparatus for loading the linked sausage strands onto the hangers 22.

As best illustrated in FIG. 4, the hangers 22 have a substantially inverted T-shape with a horizontal crossbar 24 and a vertical connecting leg 26. The crossbar 24 has a substantially undulated configuration providing 10 depressions or grooves 24a over which the 10 sausage strands previously described are intended to be festooned.

The connecting leg 26 of each hanger 22 extends upwardly from the center of the undulated crossbar 24 and is pivotally connected by a pin 28 to a yoke 30. The upper ends of the yoke 30 carry a pair of wheels 32a and 32b which ride on the lower flange 34a of an I-beam 34. The upper flange 34b of the I-beam is connected to the mechanism frame 36. The pin 28 provides a free pivotal connection between the hanger 22 and the yoke 30, so that the hanger will normally hang in a vertical position as shown at the extreme left-hand side of FIG. 2. The yoke wheels 32a and 32b will ride along the flange 34a of the I-beam, and thus the yokes and hangers 30 and 22 respectively will be guided by the I-beam 34 along a predetermined path.

In order to advance the yokes and hangers along this predetermined path, the yokes 30 are connected to a conveyor chain 38, the direction of movement of the conveyor chain 38, the yokes 30 and the hangers 22 being to the right in FIGS. 2 and 3 as indicated by the arrows. The chain 38 is driven in this direction by means of a motor 40 operating a suitable sprocket mechanism 42, both of which are schematically illustrated in FIG. 1. The yokes 30 are connected to the chain 38 at predetermined uniformly-spaced intervals, and the yokes thus become a part of the mechanism for conveying the hangers 22 along the predetermined path.

As the hangers 22 are moved along by the chain 38 and yokes 30, the delivery tubes 20 direct the linked sausage strands downwardly into the path of the hangers at a predetermined location along that path. In order to properly and uniformly festoon the linked sausage strands over the crossbars 24 of the hangers 22, a mechanism 44 is provided for manipulating the hangers with respect to the conveying apparatus and with respect to the delivery tubes 20.

The mechanism 44 is positioned rearwardly or upstream, i.e., to the left, as viewed in FIGS. 2 and 3, of the strand delivery tubes 20, and it is mounted on a mechanism support 46 suspended below the chain 38 and yokes 30 in the path of the hangers 22. The support 46 is connected to the frame 36 of the apparatus by means of suitable struts and braces 48. The mechanism 44 includes a stationary first member 50 and a movable second member 52. The first member 50 is affixed to the mechanism support 46 and preferably includes a first or hanger-cocking portion 54 and a second or hanger-holding portion 56. The hanger-cocking portion 54 extends upwardly and forwardly into the path of hanger movement, and the hanger-holding portion 56 extends forwardly in a substantially horizontal plane from the upper end of the portion 54.

As the hangers 22 are moved along their predetermined path by the chain 38 (i.e., to the right in FIG. 2), they will engage the upwardly and forwardly inclined hanger-cocking portion 54 of the stationary first member 50 and will be swung rearwardly about their pivot pins 28. The rearwardly swung or cocked hangers will be held in this position as they are moved onto and ride along the second or holding portion 56 of the first member 50. The rearward swinging or cocking of the hangers 22 is intended to keep each oncoming hanger out of the way as the linked sausage strands are fed downwardly through the tube 20 for festooning between that oncoming hanger and the hanger which has just passed the delivery tubes 20 and over which the preceding portion of the strand has been draped. It has been found, however, due at least in part to the stiffness of the product, the strands of linked sausages will not always drape as intended and the length of the festoons between hangers will tend to vary to a greater or lesser degree. One of the features of the present invention is the provision of the movable second member 52 of the mechanism 44, this second member being adapted to manipulate the hangers in such a way that the product strands are uniformly draped over and festooned between them.

The movable or second member 52 of the mechanism 44 includes a carriage 58 which is journaled on coaxial pinions 60 and 62 (see FIG. 4) in the sides of the mechanism support 46. Mounted centrally on this carriage 58 is an inverted channel-shaped guideway 64, and slidably mounted within this guideway 64 is a slide element 66. The forward end of the slide element 66 has a forwardly protruding tongue portion 68, and rearwardly of this tongue portion is an upstanding forwardly-inclined hook portion 70. The hook portion 70 is slotted or bifurcated (see FIG. 4), so that when the crossbar 24 of one of the hangers is resting on the tongue 68 (as shown in FIG. 3), the leg of the hanger may be received within the slot 70a of the hook portion 70.

The slide element 66 is movable from a rearwardly disposed or retracted position as illustrated in FIG. 2 and a forwardly disposed or extended position as illustrated in FIG. 3. When in its retracted position, the hook portion 70 is disposed rearwardly and below the forward end of the holding or second portion 56 of the first member 50. In this retracted position the hook portion 70 is also disposed rearwardly of the delivery tubes 20 and at least part of the tongue portion 68 is disposed rearwardly of the delivery tubes. The tongue portion 68 of the slide element 66 in the retracted position of that member extends forwardly of the forward end of the holding portion 56 of the first member 50 so that as the hanger members are pulled off of the forward end of the holding portion 56 of the first member, they will drop onto this tongue portion 68. The hanger 22 at the right-hand side of FIG. 2 is shown nearing the point when it will drop off of the holding portion 56 and onto the tongue portion 68 of the slide element 66.

The slide element 66 is moved within the guideway 64 of the carriage 58 by means of an air cylinder 72 having a piston 74, the end of the piston 74 being connected to the tongue portion 68 of the slide element by means of a connecting bracket 76. The air cylinder is mounted below the carriage 58.

The slide element 66 is adapted to forcibly move the hangers from their rearwardly swung position as illustrated in FIG. 2 to a forwardly swung position as illustrated in FIG. 3. In both their rearwardly and forwardly swung positions, the hangers are at angles of between about 45° and 60° with respect to their vertical or normal hanging position. In moving from a rearwardly swung position to a forwardly swung position, the hanger is thus moved through an angle of approximately 90° to 120°, and the end of the hanger, of course, swings in an arc about the pivotal axis of the pin 28 which connects the hanger 22 to the yoke 30. Since the hook portion 70 of the slide element 66 is to remain in contact with the hanger during this movement of the hanger from the rearwardly swung to the forwardly swung position, the forward end of the slide element should be permitted to follow the arcuate path of the hanger 22. It is for this reason that the carriage 58 is mounted for pivotal movement about an axis substantially parallel to the axis of the connecting pins 28 of the hanger being swung. In the illustrated embodiment, the pin 28 of each hanger as it is being swung is parallel to the horizontal coaxial pinions 60 and 62 of the carriage 58. Thus as the slide element 66 moves forwardly and rearwardly in the guideway 64 of the carriage 58, the forward end of the slide element may follow the arc of the bottom portion or horizontal arm 24 of the hanger in its movement about the axis of the hanger pin 28.

It will be noted from FIG. 2 that the pivotal axis of the carriage 58 and the slide element 66 (i.e., the axis of pinions 60 and 62) is disposed at a level intermediate the level of the hanger crossbars 24 in their normal hanging position and the level of the hanger pivot pins 28. This is so because the slide element 66 is adapted to grasp the crossbar 24 when the hanger is still rearwardly swung and the crossbar slightly raised. When the hanger is swung to its forward position as illustrated in FIG. 3, it again is elevated from the position it would normally assume in a free vertical-hanging position. Thus the carriage 58 and the slide element 66 are positioned so that the hook portion 70 of the slide element when in its normal horizontal position may grasp the slightly elevated hanger crossbar 24 and push it forwardly to approximately the same position of elevation, swinging downwardly with the crossbar in the process.

In moving from a rearwardly swung position toward the vertical, the slide element 66 and carriage 58 will be rotated about the axis of pinions 60 and 62 in a clockwise direction as viewed in FIGS. 2 and 3. Resisting this clockwise movement is a counterweight 78 connected to the rearwardly-extending end of the carriage 58 by means of a bracket 80. An adjustable stop member 82 prevents counterclockwise rotation of the carriage 58 beyond a horizontal position. While the counterweight 78 provides a convenient and reliable means for urging the carriage 58 into its normal or horizontal position, it will be apparent that any suitable means such as, for example, a spring could by utilized for this purpose.

The air cylinder 72 is operated by means of a solenoid valve 83 mounted within or adjacent to the timing mechanism 84, schematically illustrated in FIG. 1. The timing mechanism 84 may be any suitable timing means which is well-known in the mechanical art such as, for example, a cam timing means operated by the motor 40. The timing means 84 is so synchronized with the movement of the chain 38, also driven by the motor 40, that as each hanger 22 drops off the forward end of the holding portion 56 of the first member 50 and onto the tongue portion 68 of the slide element 66, the air cylinder 72 will be actuated. This actuation of the air cylinder 72 causes the piston 74 to be driven forwardly, carrying the slide element 66 with it and forcibly moving the hanger 22 from an initial rearwardly swung position to a final forwardly swung position as illustrated in FIG. 3.

It will be seen from FIGS. 2 and 3 that the hanger members are maintained in their rearwardly swung position until just before the crossbars 24 thereof reach the location of the delivery tubes 20. At this point they drop down upon the slide element 66, and the slide element is driven forwardly forcing the crossbar 24 of the hanger 22 against the product strands 10 as they issue from the delivery tubes 20. In the forwardly swung position of the hanger 22, the crossbar 24 is disposed well forward of the strand delivery tubes 20. Because of this rapid advance of the hanger through and well beyond the strand feeding area, the strands will then tend to drape or fold over the top of the hanger crossbar 24.

In order to further insure that the strands, regardless of their relative stiffness, will fold over the crossbar 24, it is preferred that a suitable gate mechanism 86 be provided. The gate mechanism 86 is disposed forwardly of the delivery tubes 20. The gate mechanism as best illustrated in FIGS. 3, 4 and 5 includes a pair of laterally-spaced plates 88 and 90 which are respectively pivotally mounted on coaxial pins 92 and 94. The pins 92 and 94 are journaled in brackets 96 which extend downwardly from and are attached to the frame 36 of the apparatus. The spacing between the plates 88 and 90 (see FIG. 5) permits movement of a hanger connecting leg 26 and the slide element 66 therebetween.

The plates 88 and 90 are urged toward a vertical position as illustrated in FIG. 2 by means of counterweights 98, and they are prevented from rotating clockwise beyond their vertical position by suitable stop means. In the illustrated embodiment the top portions 88a and 90a, respectively, of the plates are bent over the pivot pins 92 and 94, and when the plates are vertical these top portions engage stop bars 99 and 100 respectively.

In its vertical position as illustrated in FIG. 2 the plates 88 and 90 extend downwardly to a point just slightly above the level of the crossbars 24 of the hangers 22 when the hangers are in their normal vertically-disposed position. The plates 88 and 90 thus do not interfere with the hangers but merely tend to sweep the sausage strands rearwardly and downwardly over the forwardly swung hanger crossbar 24. This positively prevents the strands from overfeeding the hangers, which a particularly stiff strand may tend to do even though the hangers may be swung forwardly to the position of FIG. 3.

The sausage conveying mechanism 14 of the feed unit 16 is operated in synchronization with the movement of the conveyor chain 38 and the operation of the air cylinder 72, and may conveniently be controlled by the timing mechanism 84. Preferably the control is such that the strands 10 are advanced a predetermined number of sausage lengths immediately following the movement of a hanger 22 to its forwardly swung position.

The chain 38 is preferably driven continuously by the motor 40, however, the feeding of the sausage strands is preferably done only for a time following the forward swinging of the hanger. In this way the predetermined number of sausage links will be fed downwardly and festooned between the forwardly swung hanger and the next oncoming hanger. As a practical matter, since the movement of the air cylinder piston 74 and the swinging of the hanger 22 is substantially instantaneous, the feeding of the sausage strands 10 may commence substantially at the same time as the actuation of the air cylinder 72. In the operation of the illustrated apparatus, up to 10 strands of linked sausage strands 10 are fed from the table 12 onto the conveyor 14 which transports them simultaneously through the feed unit 16, discharging them through the discharge tubes 20 at a predetermined location. The hanger members 22 which are pivotally connected to the yokes 30 driven by the chain 38 move continuously along the predetermined path toward and through the location of the discharge tubes 20. As they are moved toward the discharge tubes 20, the hangers come into contact with the stationary first member 50 of the mechanism 44. This stationary member 50 causes the moving hangers to pivot rearwardly about their pivot pins 28 and to remain rearwardly swung or cocked as they approach the discharge tubes 20. Just before the hangers reach the discharge tubes 20, they drop off the forward end of the first member 50 and onto the slide element 66 of the movable second member 52. The timing mechanism 84 at this point actuates the air cylinder 72 of the second member 52 causing the slide element 66 to move from its retracted position illustrated in FIG. 2 to its extended position illustrated in FIG. 3. The hanger 22 which is engaged by the hook portion 70 of the slide element 66 is thus swung from a rearward position through a vertical or center position to a forward position. In this swinging movement of the hanger, the carriage 58 and slide element 66 pivot on the pinions 60 and 62. The counterweight 78 urges the carriage and slide element toward their normal or horizontal position and thus serves to maintain the slide element in contact with the hanger.

In moving to its forwardly swung position, the hanger 22 is moved against the portions of the sausage strands 10 which hang downwardly from the discharge tubes 20, and the strands will tend to fold or drape over the top of the hanger crossbar 24. This folding over is aided by the rearward and downward sweeping action of the weighted plates 88 and 90.

The sausage conveying mechanism 14 of the feed unit 16 is timed to operate just as the slide element 66 forces the hanger 22 to its forwardly swung position, and a predetermined length of sausage strand is fed downwardly between that forwardly swung hanger and the next oncoming hanger. The operation of the feed unit 16 is then interrupted until the next hanger 22 is swung forwardly. In the preferred embodiment a length of strand equal to nine sausage links is fed downwardly and festooned between each pair of hangers from each of the 10 discharge tubes 20 and the strands are thus uniformly festooned over the hangers. The slide element 66 is preferably held in its extended position by the air cylinder 72 and piston 74 for a sufficient length of time to assure proper draping of the strand over the hanger 22. The timing mechanism 84 then reverses the valve 83 controlling the flow of air to the double acting cylinder 72. The reversing of the air drives the piston 74 rearwardly causing the slide element 66 to return to its initial retracted position for receipt of the next hanger 22 when it drops off the forward end of the first member 50. The conveyor chain 38 moves the hangers continuously to transport the festooned strands through the various processing chambers in the case of a continuous sausage machine.

It is to be understood that the present disclosure has been made only by way of example and that many additional modifications, changes, and various details may be resorted to without departing from the spirit and scope of the invention as hereinafter claimed.

I claim:

1. A machine for transporting a strand of material, such as a linked sausage strand along a predetermined path, said machine including a conveyor, a plurality of hangers, each having a transverse strand-supporting formation, means pivotally connecting said hangers to said conveyor at spaced intervals, whereby said hangers will normally hang downwardly from said conveyor in a substantially vertical position, means for feeding a strand of material downwardly into the path of said hangers at a predetermined location, and means swinging each hanger rearwardly from its normal hanging position as it is moved toward said location and forcibly swinging said hanger forwardly with respect to said normal hanging position and through said location, whereby the strand of material may be festooned over said hangers.

2. The structure of claim 1 wherein said hanger swinging means includes a first member fixedly mounted for swinging said hangers rearwardly and a second member having a movable element for engaging and forcibly swinging said hangers forwardly through said location.

3. The structure of claim 1 and including means for urging the strand rearwardly and downwardly over the transverse strand-supporting formations of each hanger as that hanger is moved to a forwardly pivoted position.

4. The structure of claim 1 wherein said hanger swinging means includes a first member fixedly mounted for engagement by the hangers as they are moved by said conveyor, whereby the hangers may be swung rearwardly, and a second member having an element movable between a rearward and a forward position, said element when in said rearward position being adapted to engage each hanger after it has been engaged and swung rearwardly by said first member, said element when moving to said forward position with a hanger engaged being adapted to swing the engaged hanger forwardly through said location.

5. The structure of claim 4 wherein the hanger-engaging portion of said second member movable element is disposed below the forward end of said first member, whereby said hangers will drop onto said element hanger-engaging portion as they are moved forwardly out of engagement with said first member.

6. The structure of claim 2 wherein said first member has a first portion extending upwardly and forwardly and a second portion extending substantially horizontally from said first portion, whereby the hangers will be swung rearwardly as they engage and ride up said first portion, and they will be maintained in a rearwardly swung position by said second portion as they are moved toward said predetermined location.

7. The structure of claim 2 wherein said hangers have an inverted T-shape and with a leg portion extending upwardly from the transverse strand-supporting formations, and the forward end of said second member movable element has a longitudinally-extending nose portion for supporting the transverse strand formations of said hangers and a rearwardly disposed upstanding bifurcated hook portion for receiving the upwardly extending leg portions of said hangers.

8. The structure of claim 2 wherein the hanger-engaging portion of said second member movable element is disposed adjacent the forward end of said first member, whereby said second member movable element will engage the hangers immediately upon disengagement of the hangers with said first member.

9. The structure of claim 2 wherein said second member movable element is reciprocally movable forwardly and rearwardly and is pivotally movable about an axis substantially parallel to the axis of pivotal connection between the hanger and said conveyor when said hanger is in position for swinging, whereby the hanger-engaging portion of said element may swing with the hanger in a radius about the axis of pivotal connection as said element is reciprocally moved.

10. The structure of claim 9 wherein the hanger-engaging portion of said second member movable element when in its rearward position is disposed rearwardly of said predetermined location and when in its forward position is disposed substantially forwardly of said predetermined location.

11. The structure of claim 9 wherein the pivotal axis of said second member movable element and the axis of pivotal connection between the hanger members and said conveyor are substantially horizontal and substantially perpendicular to the direction of conveyor movement.

12. The structure of claim 9 wherein the hanger-engaging portion of said second member movable element is reciprocally movable toward and away from the pivotal axis of said movable element.

13. The structure of claim 11 wherein the pivotal axis of said second member movable element is disposed at a level intermediate the axis of pivotal connection and the lower end of the hangers in their normal hanging position.

14. The structure of claim 13 including means urging said second member movable element toward a substantially horizontal position.

15. The structure of claim 1 wherein the transverse strand-supporting formation of each hanger is a crossbar with an undulated configuration, and said feed means includes means for guiding a plurality of strands downwardly into the path of said crossbars simultaneously, whereby the several strands may be simultaneously festooned on said hanger crossbars.

16. The structure of claim 15 wherein each hanger has an inverted T-shape and includes a leg portion extending upwardly from substantially the center of said crossbar.

17. The structure of claim 1 wherein control means is provided for operating said strand feeding means to feed a predetermined length of strand downwardly into the path of said hangers only after a hanger has been moved through said feed location.